(12) United States Patent
Kuehne (10) Patent No.: US 10,528,125 B2
(45) Date of Patent: Jan. 7, 2020

(54) METHOD FOR OPERATING A VIRTUAL REALITY SYSTEM, AND VIRTUAL REALITY SYSTEM

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 137 days.

(21) Appl. No.: 15/564,381

(22) PCT Filed: Nov. 17, 2016

(86) PCT No.: PCT/EP2016/077970
§ 371 (c)(1),
(2) Date: Oct. 4, 2017

(87) PCT Pub. No.: WO2017/108286
PCT Pub. Date: Jun. 29, 2017

(65) Prior Publication Data
US 2018/0136716 A1 May 17, 2018

(30) Foreign Application Priority Data

Dec. 22, 2015 (DE) .......................... 10 2015 226 580

(51) Int. Cl.
*G09G 5/00* (2006.01)
*G06F 3/01* (2006.01)
(Continued)

(52) U.S. Cl.
CPC ........... *G06F 3/012* (2013.01); *G02B 27/017* (2013.01); *G06T 19/003* (2013.01); *H04W 4/021* (2013.01)

(58) Field of Classification Search
CPC .......... G06T 13/40; G06T 17/00; G06T 13/20
See application file for complete search history.

(56) References Cited

U.S. PATENT DOCUMENTS

2008/0030499 A1* 2/2008 Wanda .................... G06F 3/011
345/419
2013/0326364 A1* 12/2013 Latta ....................... G06F 3/012
715/751

(Continued)

FOREIGN PATENT DOCUMENTS

CN         103593051 A     2/2014
DE    10 2015 226 580.3    12/2015
(Continued)

OTHER PUBLICATIONS

German Office Action dated Oct. 10, 2016 from German Patent Application No. 10 2015 226 580.3, 12 pages.
(Continued)

*Primary Examiner* — Nan-Ying Yang
(74) *Attorney, Agent, or Firm* — Staas & Halsey LLP (57) ABSTRACT

A position and a head alignment of a person who is wearing virtual reality glasses is detected by a detection device within a detection area of the detection device. A virtual object arranged in a virtual environment is displayed using virtual reality glasses, from a virtual perspective set in accordance with the detected position and head alignment. Based on the detected position, whether the person is located less than a predefined distance from a boundary of the detection area is determined. If it is determined that the person is less than the predefined distance from the boundary, an effect indicating the person is less than the predefined distance from the boundary is displayed, using the virtual reality glasses. The type of depiction of the effect is set depending on the head alignment that has been determined.

20 Claims, 3 Drawing Sheets

(51) Int. Cl.
  *G02B 27/01* (2006.01)
  *G06T 19/00* (2011.01)
  *H04W 4/021* (2018.01)

(56) References Cited

U.S. PATENT DOCUMENTS

| 2013/0336629 | A1* | 12/2013 | Mulholland | H04N 9/87 386/230 |
| 2015/0092015 | A1 | 4/2015 | Stafford | |
| 2015/0363056 | A1* | 12/2015 | Wengelnik | G06F 3/04886 715/771 |
| 2016/0171770 | A1* | 6/2016 | Pedrotti | G02B 27/017 345/633 |
| 2016/0313790 | A1* | 10/2016 | Clement | G06F 3/011 |

FOREIGN PATENT DOCUMENTS

| EP | 1 538 512 A2 | 6/2005 |
| GB | 2524269 A | 9/2015 |
| WO | PCT/EP2016/077970 | 11/2016 |

OTHER PUBLICATIONS

International Search Report dated Feb. 1, 2017 from International Patent Application No. PCT/EP2016/077970, 3 pages.
Cirio et al., "The Magic Barrier Tape: a Novel Metaphor for Infinite Navigation in Virtual Worlds with a Restricted Walking Workspace", 16th ACM Symposium on Virtual Reality—Software and Technology; Nov. 2009, pp. 155-162.
Greuter et al., "SpaceWalk: Movement and Interaction in Virtual Space with Commodity Hardware", Interactive Entertainment, ACM, Dec. 2014, 7 pages.
Translation of International Preliminary Report on Patentability dated Jul. 5, 2018 from International Patent Application No. PCT/EP2016/077970, 8 pages.
Chinese Office Action dated Oct. 25, 2019 from Chinese Patent Application No. 201680022260.6 with English translation of summary of Examiner's comments, 8 pages.

* cited by examiner

METHOD FOR OPERATING A VIRTUAL REALITY SYSTEM, AND VIRTUAL REALITY SYSTEM

CROSS REFERENCE TO RELATED APPLICATIONS

This application is a U.S. national stage of International Application No. PCT/EP2016/077970, filed on Nov. 17, 2016. The International Application claims the priority benefit of German Application No. 10 2015 226 580.3 filed on Dec. 22, 2015. Both the International and the German application are incorporated by reference herein in their entirety.

BACKGROUND

Described herein is a method for operating a virtual reality system and a virtual reality system.

A virtual reality can be represented by a virtual reality system, wherein virtual reality usually refers to the representation and simultaneous perception of the reality in its physical properties in a real-time, computer-generated interactive virtual environment.

Virtual reality systems can include virtual reality glasses for displaying a virtual environment. Virtual reality glasses are a specific form of a so-called head-mounted display, in which a visual output device that is worn on the head is involved. It presents images on a screen that is close to the eyes, or projects them directly onto the retina. Virtual reality glasses here additionally have further sensors for detecting the movement of the head. This permits the display of a calculated graphic to be adapted to the movements of a wearer of the virtual reality glasses. Due to their physical closeness, the displayed image surfaces of head-mounted displays appear considerably larger than the free-standing screens, and in the extreme case even cover the user's entire visual field. Since respective displays of virtual reality glasses will follow all a wearer's head movements through the head position, the wearer gets the feeling of moving directly in an image landscape generated by a computer.

Virtual reality systems of this sort can include a detection device by which a position of virtual reality glasses arranged in a detection region and/or of a person who has put the virtual reality glasses on can be detected. Depending on the detected position of the virtual reality glasses and/or of the person, the contents displayed by using the virtual reality glasses can be adjusted such that the person who has put the virtual reality glasses on can move within a displayed, virtual environment relative to a virtual object. Because of technical and/or cost-related conditions, it can happen that the detection region within which a position of the virtual reality glasses and/or of the person can be detected reliably is relatively small in comparison with the size of the displayed virtual environment. In a case of this type, the problem can in particular arise that a wearer of the virtual reality glasses moves out of the detection region within which alone a reliable detection of the position of the virtual reality glasses and/or of the person wearing the virtual reality glasses is possible. It is consequently no longer possible to ensure that real changes in the position of the person are converted into corresponding changes in the virtual position when displaying the virtual environment.

SUMMARY

It is therefore an aspect of the disclosure to provide a solution by which a wearer of virtual reality glasses can be warned reliably as soon as he is about to leave a detection region of a detection device whose purpose is to detect the position of the wearer and/or of the virtual reality glasses.

Described herein is a method for operating a virtual reality system and a virtual reality system. Advantageous embodiments with expedient and non-trivial developments are described herein.

In the method for operating a virtual reality system described herein, a position and a head alignment of a person who has put virtual reality glasses on and who is located in a detection region of a detection device is continuously detected by using the detection device. According to the detected position and head alignment, a virtual object arranged in a virtual environment is displayed from a virtual perspective by using the virtual reality glasses. On the basis of the continuously detected position, it is also determined whether the person has moved below a prespecified distance from a boundary of the detection region. For as long as it is determined that the person has moved below the prespecified distance, an effect that identifies moving below the prespecified distance is displayed by using the virtual reality glasses, wherein the way in which the effect is displayed is specified depends on the detected head alignment of the person.

An aspect of the disclosure is based here on the recognition that in virtual reality applications in which a user can move freely with respect to an object represented in the virtual environment, a virtual vehicle for example, it is always possible that the user moves out of the detection region, only within which a reliable detection of the position of the person by using the relevant detection device is possible. An aspect of the disclosure is, in addition, based on the recognition that it makes a real difference whether the person moves, for example, backwards out of the detection region or forwards out of the detection region, since the perspective of the displayed virtual environment is also usually adjusted depending on the head alignment.

According to the method described herein it is thus on the one hand at first possible for the person who has put on the virtual reality glasses to be advised in a reliable manner when they are about to leave the detection region of the detection device. On the other hand it is possible, through the display of the effect, being dependent on the alignment of the head, by which moving below the prespecified distance from the corresponding boundary of the detection region is displayed to the person, to make known in a particularly reliable manner that the person is about to leave the detection region of the detection device. Through the manner of the display of the effect being dependent on the head alignment, it is also possible for the disturbing influence on the perception of the displayed virtual environment to be particularly well minimized, without the instructive character of the displayed effect being reduced too much. Since if the person who has put the virtual reality glasses on moves, for example, backwards in the direction of a boundary of the detection region, they also move backwards away from the displayed virtual object. Usually the person will here be looking in the direction of the displayed virtual object, as a result of which a different form for the display of the effect for warning the person is more helpful than when the person moves forwards towards the corresponding boundary of the detection region, thereby not looking in the direction of the displayed virtual object.

An advantageous embodiment provides that, on the basis of the detected head alignment, it is determined whether the head of the person, on moving below the prespecified distance, is aligned frontally or backwards to the boundary of the detection region. Through the distinction between frontal and backwards alignment of the head of the person, the display of the identifying effect can be selected particularly appropriately, so that the person can, on the one hand, be reliably advised that they are about to leave the detection region, and on the other hand the person's perception of the displayed virtual environment can be disturbed as little as possible even by the display of the effect adapted to the head alignment.

A further advantageous embodiment provides that a binocular field of view is provided for the person, and that a frontal alignment is assumed if the boundary of the detection region is located in the binocular field of view, and that a backwards alignment is assumed otherwise. Binocular field of view refers to the space that can be surveyed at one time, with the head held steady and without moving the eyes, when fixing an object. The binocular field of view, i.e. the space that can be surveyed with the two eyes together, can for example be specified as about 220° in a horizontal direction. This corresponds to a typical average value for a human being. Since the person has put the virtual reality glasses on, they cannot truly see their real environment, and therefore also cannot see the boundary of the detection region. The specified binocular field of view of the virtual reality glasses is however mapped so that, for example, on the basis of the detected alignment of the virtual reality glasses it is possible on the one hand to make a conclusion on the head alignment and on the other hand whether, if the virtual reality glasses were taken off, the relevant boundary of the detection region would be located in the binocular field of view or not. It is possible through this to determine in a particularly simple and reliable manner, whether the head of the person, on moving below the prespecified distance, is aligned frontally or backwards to the boundary of the detection region.

In a further advantageous embodiment, it is provided that in the case of a frontal alignment of the head to the boundary, exclusively a virtual border arranged in the virtual environment of the person is displayed as the effect by using the virtual reality glasses. A kind of virtual fence or virtual barrier can, for example, be displayed, with an extension that is sharply limited in the virtual environment. The realistic perception of the virtual environment and of the virtual object displayed therein is thus only very minimally restricted, while the person is nevertheless informed in a reliable manner that they are about to leave the detection region of the detection device.

According to a further advantageous embodiment, it is provided that in the case of a backwards alignment of the head to the boundary, a grid corresponding to the detection region is displayed as the effect in the virtual environment by using the virtual reality glasses. If, for example, the person goes backwards in reality against a boundary of the detection region, and has their head aligned forwards at that time, they would not be able to see the region lying behind them in the virtual environment at all. Due to the fact that that in such a case, and also quite generally in the case of a backwards alignment of the head to the boundary, a grid corresponding to the detection region is displayed as an effect in the virtual environment, the person is nevertheless advised in a reliable manner that they are about to leave the detection region of the detection device.

A further advantageous embodiment provides that in the case of a backwards alignment of the head to the boundary, the virtual object is at least partially masked and/or darkened by using the virtual reality glasses. This is because in the case of a backwards alignment of the head to the boundary, the person will usually be looking towards the displayed virtual object. Due to the fact that in such a case the virtual object is at least partially masked and/or darkened, the person is advised in a simple and reliable manner that they are about to leave the detection region of the detection device.

In a further advantageous embodiment it is provided that with a backwards alignment of the head to the boundary, the virtual environment is at least partially masked and/or darkened. With this procedure again, the person is advised in a particularly simple and reliable manner that they are about to leave the detection region of the detection device.

According to a further advantageous embodiment, it is provided that the virtual perspective from which the virtual object arranged in the virtual environment is displayed is specified in such a way that a virtual viewing direction of the detected head alignment and a virtual observation position corresponds to the detected position of the person. For detection of the head alignment, and for detection of the position of the person, it is possible, for example, for the alignment and positioning of the virtual reality glasses to be continuously detected by using the detection device. A real change in the position of the person is thus preferably converted one-to-one into a corresponding change in position within the displayed virtual environment. Equally, a real change in the head alignment is converted into a corresponding change in the virtual viewing direction onto the displayed virtual object. The person can thus move virtually in a particularly natural manner within the displayed virtual environment, and can observe the displayed virtual object from very different virtual viewing directions and virtual observation positions, and, in addition, be reliably warned as soon as there is a risk of leaving the detection region of the detection device. Even if the detection region is relatively small in comparison with the size of the displayed virtual environment, the person is thus not at risk of leaving the detection region, since they are advised in good time of this through the display of the effect depending on the alignment of the head.

The virtual reality system described herein includes virtual reality glasses and a detection device which is designed to detect a position and a head alignment of a person who has put on the virtual reality glasses and who is located in a detection region. In addition, the virtual reality system may include a control device which is designed to cause the virtual reality glasses to display a virtual object arranged in a virtual environment from a virtual perspective which is specified depending on the detected position and head alignment. The control device is, moreover, designed to determine on the basis of the detected position whether the person has moved below a prespecified distance from a boundary of the detection region. The control device is, furthermore, designed to cause the virtual reality glasses to display an effect indicating moving below the prespecified distance, for as long as it is detected that the person has moved below the prespecified distance, wherein the way in which the effect is displayed is specified depending on the detected head alignment. Advantageous embodiments of the method described herein are to be deemed to be advantageous embodiments of the virtual reality system described herein, wherein the virtual reality system carries out the method operations.

Further advantages, characteristics and details emerge from the following description of one or more exemplary embodiments, and with reference to the drawings. The features and feature combinations referred to in the description above, as well as the features and feature combinations referred to below in the description of the drawings and/or only illustrated in the drawings, can not only be used in the respectively indicated combination, but also in other combinations or alone without going beyond the scope of the disclosure.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to preferred embodiments, examples of which are illustrated in the accompanying drawings, wherein like reference numerals refer to like elements throughout. That is, the same reference codes have been used in the drawings to identify elements that are identical or have the same functions.

Figure 1:
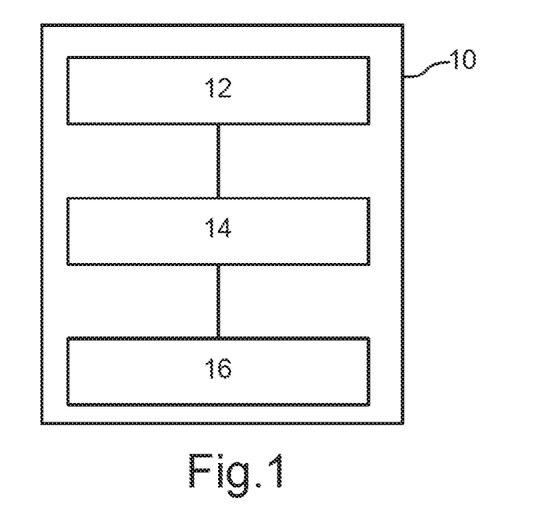
FIG. 1 is a schematic illustration of a virtual reality system that includes virtual reality glasses, a control device for driving the virtual reality glasses, and a detection device for the detection of position and for detecting the alignment of the virtual reality glasses.

A schematic illustration of a virtual reality system, identified as a whole with 10, is shown in FIG. 1. The virtual reality system 10 may include virtual reality glasses 12, a control device 14 for driving the virtual reality glasses 12, and a detection device 16 which is designed to detect a position and an alignment of the virtual reality glasses 12.

Figure 2:
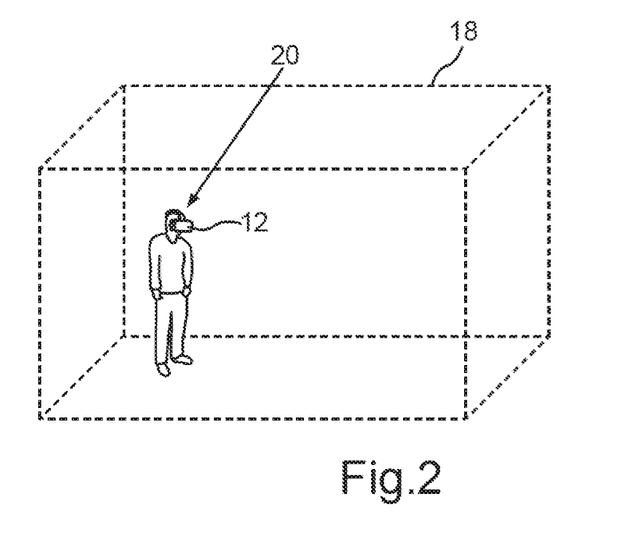
FIG. 2 is a perspective view of a schematically illustrated detection region of the detection device in which a person who has put on the virtual reality glasses is arranged.

A schematic perspective view of a detection region 18 of the detection device 16 is illustrated in FIG. 2, wherein a person 20 who has put on the virtual reality glasses 12 is located inside the detection region 18. As long as the virtual reality glasses 12 are located inside the detection region 18, the detection device 16 can reliably determine the position and alignment of the virtual reality glasses 12. On the basis of the detected position and alignment data of the virtual reality glasses 12, the control device 14 can determine a position and head alignment of the person 20. For as long as the person 20 is not located outside the detection region 18, and the virtual reality glasses 12 are thus within the detection region 18, changes to the position of the person 20 and changes to the head alignment of the person 20 are reliably detected or determined by using the detection device 16 in combination with the control device 14.

Figure 3:
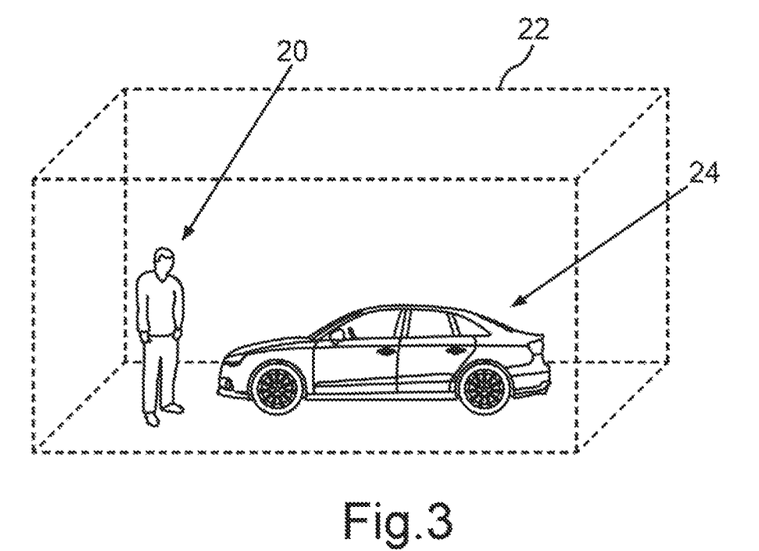
FIG. 3 is a schematic perspective view of a virtual environment displayed by using virtual reality glasses, within which a virtual motor vehicle is displayed.

A schematic perspective view of a virtual environment 22 within which a virtual motor vehicle 24 is arranged is shown in FIG. 3. The virtual environment 22, along with the virtual motor vehicle 24, are thus displayed by using the virtual reality glasses 12. The virtual motor vehicle 24 is here displayed by using the virtual reality glasses 12 from a virtual perspective which is specified corresponding to the detected position and head alignment of the person 20. In FIG. 3, the person 20 is only shown for illustrative purposes, in order to clarify the virtual perspective from which the virtual motor vehicle 24 is currently displayed by using the virtual reality glasses 12. The virtual perspective from which the virtual motor vehicle 24 arranged in the virtual environment 22 is displayed is specified in such a way that a virtual viewing direction of the detected head alignment and a virtual observation position corresponds to the detected position of the person 20. Thus if the person 20 turns their head, the virtual reality glasses 12 are so driven that the person 20 changes their virtual head alignment and thus also their virtual viewing direction onto the virtual motor vehicle 24 within the virtual environment 22. If the person 20 moves in reality, the person 20 inside the virtual environment 22 also moves correspondingly, so that for example their distance from the virtual motor vehicle 24 is virtually enlarged or reduced.

As is suggested by the two figures FIGS. 2 and 3, the virtual environment 22 is significantly larger than the detection region 18 within which a reliable detection of the position and alignment of the virtual reality glasses 12 can be determined, and thereby also a reliable determination of the head alignment and position of the person 20 achieved. As a result, the person 20 can be at risk of accidentally leaving the detection region 18, for example if the person 20 wishes to increase their virtual distance from the virtual motor vehicle 24. As soon as the person 20 does however leave the detection region 18, it is no longer possible to ensure reliably that changes in position and changes in the head alignment of the person 20 within the virtual environment 22 can be appropriately converted one-to-one.

Figure 4:
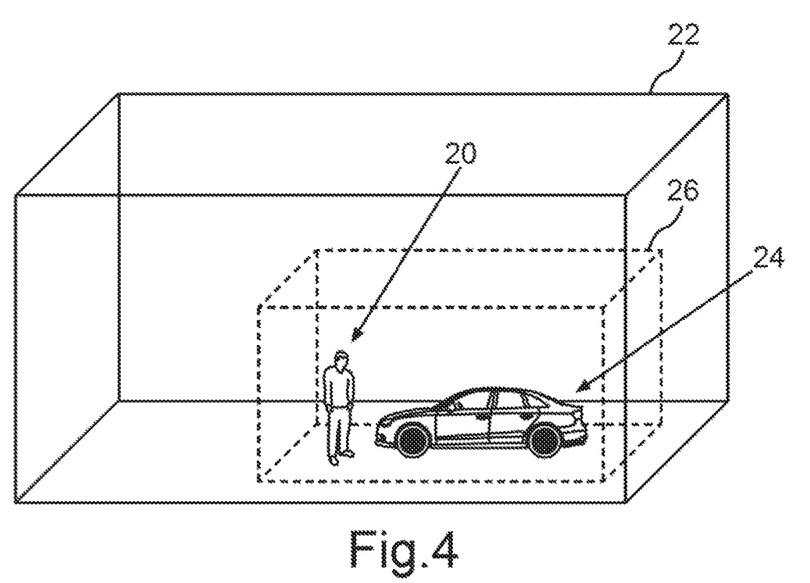
FIG. 4 is a further perspective view of the schematically illustrated virtual environment, where a grid identifying the detection region of the detection device is shown within the virtual environment by using the virtual reality glasses.

A further schematic perspective view of the virtual environment 22, together with the virtual motor vehicle 24, is shown in FIG. 4. On the basis of the continuously determined position of the person 20, a determination is made by using the control device 14 of whether the person 20 has moved below a prespecified distance from a boundary of the detection region 18. In the case of the detection region 18 with a cuboid form as suggested in FIG. 2, respective borders of the detection region 18 are thus defined by the four side walls and by a type of ceiling. Because leaving the detection region 18 upwards is rather unlikely, it may also be sufficient only to check continuously whether the person 20 has left the detection region 18 in a horizontal direction.

As soon as it is determined that the person 20 has moved below the prespecified distance from one of the borders of the detection region 18, an effect indicating moving below the prespecified distance is displayed by using the virtual reality glasses 12. The way in which this effect is displayed is selected here depending on the head alignment determined for the person 20. Here, on the basis of the detected head alignment of the person 20, it is determined whether the head of the person 20, on moving below the prespecified distance from the relevant border, is aligned frontally or backwards to the corresponding boundary of the detection region 18. For this purpose a binocular field of view can, for example, be specified for the person 20, wherein a frontal alignment is assumed if the relevant border of the detection region 18 is located in the binocular field of view of the person 20, and otherwise a backwards alignment of the head of the person 20 is assumed.

The case in which the person 20—corresponding to the illustration in FIG. 2—is likely to emerge to the left out of the detection region 18, as the person 20 is at the moment moving backwards, is illustrated in FIG. 4. On the basis of the head alignment of the person 20, the virtual motor vehicle 24 is thus displayed with a frontal view by using the virtual reality glasses 12, while the person 20, as a result of their real movement, moves virtually backwards further and further away from the virtual motor vehicle 24. If the person 20 now in reality moves too close to the left-hand border of the detection region 18, a grid 26 corresponding to the real detection region 18 is displayed as an effect inside the virtual environment 22, in order to advise the person 20 that they are about to leave the detection region 18. The grid 26 is here selected to have exactly the same size as the real detection region 18. Through the display of the grid 26, the person 20 inside the virtual environment 22 can easily recognize that they are about to emerge backwards out of the detection region 18.

Alternatively or in addition, when the alignment of the head of the person 20 is backwards with respect to the relevant border of the detection region 18, it can also be provided that the virtual motor vehicle 24 is at least partly masked and/or darkened by using the virtual reality glasses 12. If the person 20 moves directly backwards to one of the borders of the detection region 18, and has their head aligned more or less directly straight ahead, they continue to look at the virtual motor vehicle 24 inside the virtual environment 22. Due to the fact that, when moving below the prespecified distance from the corresponding border of the detection region 18, the virtual motor vehicle 24 is at least partially masked and/or darkened, the person 20 is instructed in a simple manner not to leave the detection region 18. Alternatively or in addition it can also be provided that in such a case the virtual environment 22, which may for example be a kind of virtual showroom or the like, is at least partially masked and/or darkened. In this way the person 20 is again reminded in a reliable manner that they are about to emerge backwards from the detection region 18.

Figure 5:
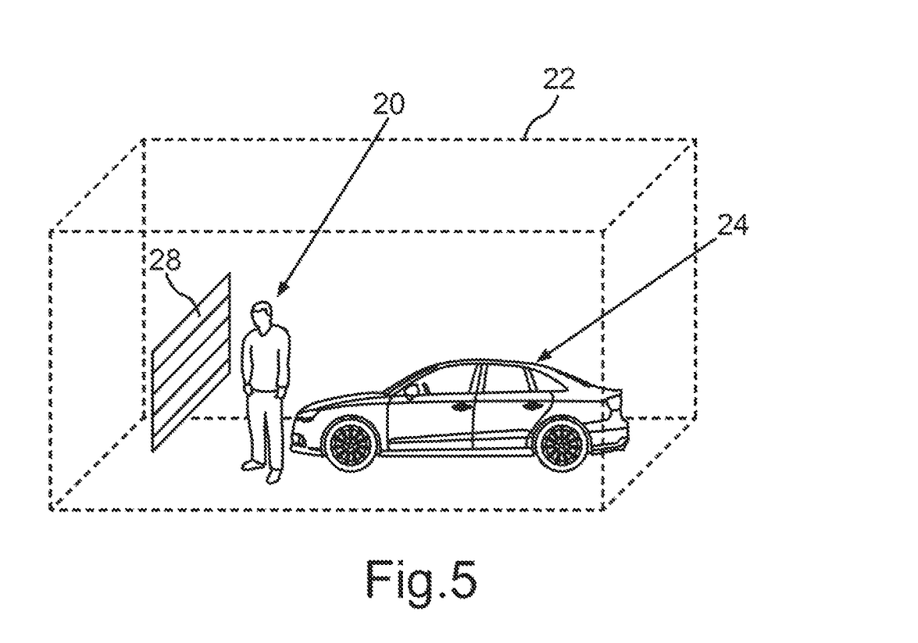
FIG. 5 is a further perspective view of the schematically illustrated environment, wherein a virtual border is shown by using the virtual reality glasses.

A further perspective view of the virtual environment 22, together with the virtual motor vehicle 24, is shown in FIG. 5. In the present case, the person 20 is about to leave the detection region 18—again starting from the illustration in FIG. 2—stepping forwards to the left. Since the person 20 here has their head aligned straight ahead, they are looking within the virtual environment 22 away from the virtual motor vehicle 24. If the person 20 here moves below the prespecified distance from the relevant border of the detection region 18, then due to the frontal alignment of the head of the person 20 with respect to the border of the detection region 18, a virtual border 28 is displayed in the virtual environment 22 in front of the person 20 by using the virtual reality glasses 12, in order to advise the person 20 that they are about to emerge from the detection region 18. In this case a very limited local effect is thus displayed within the virtual environment 22, in order to advise the person 20 that they are about to leave the detection region 18. As a result of their real head alignment, and of the resulting virtual viewing direction, it is therefore sufficient to display the relatively small border 28 within the virtual environment 22 in order to advise the person 20 that they are about to leave the detection region 18. Because of the frontal head alignment, the border 28 also has a directive character for the person 20. It becomes clear to the person 20 that they are heading directly frontally to one of the boundaries of the detection region 18, and the approaching boundary of the detection region 18 within the displayed virtual environment 22 is indicated by the border 28.

Through the display of a corresponding effect, depending on the alignment of the head, by which the person 20 is advised that they are about to leave the detection region 18, the person 20 can on the one hand relatively effectively be prevented from actually leaving the detection region 18, and on the other hand the perception of the displayed virtual environment 22 is impaired thereby as little as possible.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a virtual reality system, the method comprising:
    detecting, by a detection device comprising a processor, a position and a head alignment of a person wearing virtual reality glasses and who is located in a detection region of the detection device;
    displaying, using the virtual reality glasses, a virtual object disposed in a virtual environment from a virtual perspective specified based on the position and head alignment detected by the detection device;
    determining, based on the position detected by the detection device, whether the person is located less than a prespecified distance from a boundary of the detection region; and
    when the determining determines the person is located less than the prespecified distance from the boundary, displaying an effect using the virtual reality glasses indicating the person is less than the prespecified distance from the boundary, the effect that is displayed being specified based on the head alignment detected by the detection device with respect to the boundary such that:
    when the person moves away from the virtual object while facing toward the virtual object, and the determining determines the person is located less than the prespecified distance from the boundary, displaying, using the virtual reality glasses, a first effect warning the person they are less than the prespecified distance from the boundary, and
    when the person moves away from the virtual object while facing away from the virtual object, and the determining determines the person is located less than the prespecified distance from the boundary, displaying, using the virtual reality glasses, a second effect warning the person they are less than the prespecified distance from the boundary.

2. The method as claimed in claim 1,
    wherein, when the person is located less than the prespecified distance from the boundary, the detecting the head alignment of the person wearing the virtual reality glasses comprises determining, by the detection device, whether the head of the person, is aligned frontally or backwards relative to the boundary of the detection region.

3. The method as claimed in claim 2, wherein
    a binocular field of view is provided for the person,
    a frontal alignment is determined by the detection device if the boundary of the detection region is located in the binocular field of view, and
    a backwards alignment is determined by the detection device if the boundary of the detection region is not located in the binocular field of view.

4. The method as claimed in claim 2, wherein when a frontal alignment is determined by the detection device, the second effect displayed using the virtual reality glasses comprises a virtual border disposed in the virtual environment of the person.

5. The method as claimed in claim 2, wherein when a backwards alignment is determined by the detection device, the first effect displayed using the virtual reality glasses comprises a grid corresponding to the detection region.

6. The method as claimed in claim 2, wherein when a backwards alignment is determined by the detection device, the first effect displayed using the virtual reality glasses comprises a partially masked and/or darkened virtual object.

7. The method as claimed in claim 2, wherein when a backwards alignment is determined by the detection device, the first effect displayed using the virtual reality glasses comprises a partially masked and/or darkened virtual environment.

8. The method as claimed in claim 1, wherein the virtual perspective from which the virtual object is displayed is specified so that a virtual viewing direction of the head alignment detected by the detection device and a virtual observation position corresponds to the position of the person detected by the detection device.

9. A virtual reality system, comprising:
virtual reality glasses;
a detection device comprising a processor configured to detect a position and a head alignment of a person wearing the virtual reality glasses and who is located in a detection region of the detection device;
a controller comprising another processor configured:
 to control the virtual reality glasses to display a virtual object disposed in a virtual environment from a virtual perspective specified based on the position and head alignment detected by the detection device,
 to determine, based on the position detected by the detection device, whether the person is located less than a prespecified distance from a boundary of the detection region, and
 to control the virtual reality glasses to display an effect indicating the person is less than the prespecified distance from the boundary when the controller determines the person is located less than the prespecified distance from the boundary, the effect that is displayed being specified based on the head alignment detected by the detection device with respect to the boundary such that:
  if the person moves away from the virtual object while facing toward the virtual object, and the person is determined to be located less than the prespecified distance from the boundary, the controller is configured to control the virtual reality glasses to display a first effect warning the person they are less than the prespecified distance from the boundary, and
  if the person moves away from the virtual object while facing away from the virtual object, and the person is determined to be located less than the prespecified distance from the boundary, the controller is configured to control the virtual reality glasses to display a second effect warning the person they are less than the prespecified distance from the boundary.

10. The virtual reality system as claimed in claim 9, wherein, when the person is located less than the prespecified distance from the boundary, the detection device is configured to detect the head alignment of the person wearing the virtual reality glasses by determining whether the head of the person is aligned frontally or backwards relative to the boundary of the detection region.

11. The virtual reality system as claimed in claim 10, wherein
 a binocular field of view is provided for the person,
 a frontal alignment is determined by the detection device if the boundary of the detection region is located in the binocular field of view, and
 a backwards alignment is determined by the detection device if the boundary of the detection region is not located in the binocular field of view.

12. The virtual reality system as claimed in claim 10, wherein when a frontal alignment is determined by the detection device, the second effect displayed using the virtual reality glasses comprises a virtual border disposed in the virtual environment of the person.

13. A virtual reality system, comprising:
virtual reality glasses;
a detection device comprising a processor configured to detect a position and a head alignment of a person wearing the virtual reality glasses and who is located in a detection region of the detection device;
a controller comprising another processor configured:
 to control the virtual reality glasses to display a virtual object disposed in a virtual environment from a virtual perspective specified based on the position and head alignment detected by the detection device,
 to determine, based on the position detected by the detection device, whether the person is located less than a prespecified distance from a boundary of the detection region, and
 to control the virtual reality glasses to display an effect indicating the person is less than the prespecified distance from the boundary when the controller determines the person is located less than the prespecified distance from the boundary, the effect that is displayed being specified based on the head alignment detected by the detection device with respect to the boundary,
wherein
 when the person is located less than the prespecified distance from the boundary, the detection device is configured to detect the head alignment of the person wearing the virtual reality glasses by determining whether the head of the person is aligned frontally or backwards relative to the boundary of the detection region, and
 when a backwards alignment is determined by the detection device, a grid corresponding to the detection region is displayed as the effect in the virtual environment using the virtual reality glasses.

14. The virtual reality system as claimed in claim 10, wherein when a backwards alignment is determined by the detection device, the first effect displayed using the virtual reality glasses comprises a partially masked and/or darkened object.

15. The virtual reality system as claimed in claim 10, wherein when a backwards alignment is determined by the detection device, the first effect displayed using the virtual reality glasses comprises a partially masked and/or darkened virtual environment.

16. The virtual reality system as claimed in claim 9, wherein the virtual perspective from which the virtual object is displayed is specified so that a virtual viewing direction of the head alignment detected by the detection device and a virtual observation position corresponds to the position of the person detected by the detection device.

17. The virtual reality system as claimed in claim 9, wherein the virtual object is a motor vehicle.

18. The virtual reality system as claimed in claim 13, wherein
- if the person moves away from the virtual object while facing toward the virtual object, and the person is determined to be located less than the prespecified distance from the boundary, the controller is configured to control the virtual reality glasses to display the grid warning the person they are less than the prespecified distance from the boundary, and
- if the person moves away from the virtual object while facing away from the virtual object, and the person is determined to be located less than the prespecified distance from the boundary, the controller is configured to control the virtual reality glasses to display another effect warning the person they are less than the prespecified distance from the boundary.

19. The virtual reality system as claimed in claim 9, wherein
- the detection region has a cuboid shape, and
- a size of the detection region is less than a size of the virtual environment.

20. The virtual reality system as claimed in claim 19, wherein the controller is configured to determine whether the person is located within the detection region with respect to only a horizontal direction of the cuboid.

\* \* \* \* \*